(12) United States Patent
Kodimer et al.

(10) Patent No.: US 11,012,581 B1
(45) Date of Patent: May 18, 2021

(54) SYSTEM AND METHOD FOR AUTOMATED DEVICE SERVICE CALL INITIATION

(71) Applicant: Toshiba TEC Kabushiki Kaisha, Shinagawa-ku (JP)

(72) Inventors: Marianne Kodimer, Huntington Beach, CA (US); Louis Ormond, Irvine, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 17/003,333

(22) Filed: Aug. 26, 2020

(51) Int. Cl.
| | |
|---|---|
| *H04N 1/00* | (2006.01) |
| *H04L 29/08* | (2006.01) |
| *G06K 9/00* | (2006.01) |
| *G06F 3/0482* | (2013.01) |
| *G06F 3/0488* | (2013.01) |

(52) U.S. Cl.
CPC ..... *H04N 1/00344* (2013.01); *G06K 9/00671* (2013.01); *H04L 67/141* (2013.01); *H04N 1/00058* (2013.01); *H04N 1/00323* (2013.01); *G06F 3/0482* (2013.01); *G06F 3/0488* (2013.01); *G06K 2209/01* (2013.01); *H04N 2201/0094* (2013.01)

(58) Field of Classification Search
CPC ........... H04N 1/00344; H04N 1/00058; H04N 1/00323; H04N 2201/0094; H04L 67/141; G06K 9/00671; G06K 2209/01; G06F 3/0482; G06F 3/0488
See application file for complete search history.

(56) References Cited

U.S. PATENT DOCUMENTS

| | | | |
|---|---|---|---|
| 9,235,819 B2* | 1/2016 | Torii | H04N 1/00037 |
| 2015/0341507 A1* | 11/2015 | Kodimer | G06K 9/00456 |
| | | | 358/1.13 |
| 2016/0344877 A1* | 11/2016 | Altamirano | H04N 1/00129 |
| 2018/0262629 A1* | 9/2018 | Shih | H04L 41/0213 |
| 2019/0253580 A1* | 8/2019 | Kodimer | H04N 1/00973 |

* cited by examiner

*Primary Examiner* — Neil R McLean
(74) *Attorney, Agent, or Firm* — Ulmer & Berne LLP

(57) ABSTRACT

A system and method for automated service call initiation for a multifunction peripheral includes applying optical character recognition to a digital image of an affixed asset tag captured by a smartphone or tablet camera to determine a service agency name and initial contact information. A dealer database is queried with the service agency name and initial contact information, and corresponding information about the service agency, customer or device is received. Information about a current state of the multifunction peripheral is received. A service request or order is selectively sent by a user via the smartphone or tablet to the service agency in accordance with information from the dealer database and the current state of the multifunction peripheral.

20 Claims, 4 Drawing Sheets

SYSTEM AND METHOD FOR AUTOMATED DEVICE SERVICE CALL INITIATION

TECHNICAL FIELD

This application relates generally to automated initiation of multifunction peripheral servicing by scanning of text from an asset tag affixed to an exterior of the device.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

When MFPs require servicing, an administrator must initiate a service call to a servicing dealer associated with the device. MFPs are frequently leased and maintained through an authorized dealer. A dealer typically affixes an asset tag to a device that they provide. An asset tag may include dealer contact information, such as a phone number to call for servicing. A tag may also include a device ID associated with the MFP to which the asset tag is affixed.

An administrator typically calls the phone number on the asset tag to initiate servicing. Their call is answered by an operator at the dealer. The administrator provides information to allow the operator to document a device type and location. Using this information, they can lookup information about the device, such as hardware setup, installed applications, service history, firmware versions, and the like. The operator then creates a service ticket to dispatch a technician for servicing. The aforementioned process relies intensively on human resources. Both the administrator and receptionist are being paid for their efforts, and human resources are usually the most expensive investment in a business. When humans are involved, there is always a chance for error, for example, transposing figures in a device ID. Additionally, there may be miscommunication whenever two people interact.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Initiating a service call regarding an office device such as an MFP currently requires an administrator to call or email the servicing dealer, setup an appointment or request, provide a description of the problem, and communicate details including but not limited to, the location of the device, the requestor's contact information, etc. This can be costly to the customer and dealer in terms of time, misinformation or miscommunication, inefficient estimations, etc.

Example embodiments of the subject application include a mobile app that allows a device administrator, such as a department administrator or a company administrator, an ability to initiate service requests directly by scanning a device equipment ID Tag, typically located on a front of an MFP. Customer information, device information and dealer information is looked up in accordance with information from reading the tag. This data is coupled with a collection of status data corresponding to a current status of the device. The aggregated information enables a user to initiate a frictionless service call for MFP tasks including, but not limited, to scheduling a service call, ordering toner, requesting copier move service, and requesting professional services.

In accordance with further example embodiments, optical character recognition ("OCR") is employed to read asset tag information including a servicing dealer name and asset identification number, and an app queries a dealer database to collect metadata, including dealer contact information, customer contact information, device name, model, serial number, and location information used to initiate a service call. Additionally, the app collects the target device error status, device codes and service history to provide insights to the servicing dealer. This information, in combination, allows the user and servicing manager a frictionless service experience.

Aggregated information is packaged and be sent to a servicing dealer to facilitate automatic scheduling of a service call, toner or ink order, a request for an MFP move service or reporting of an issue.

Figure 1:
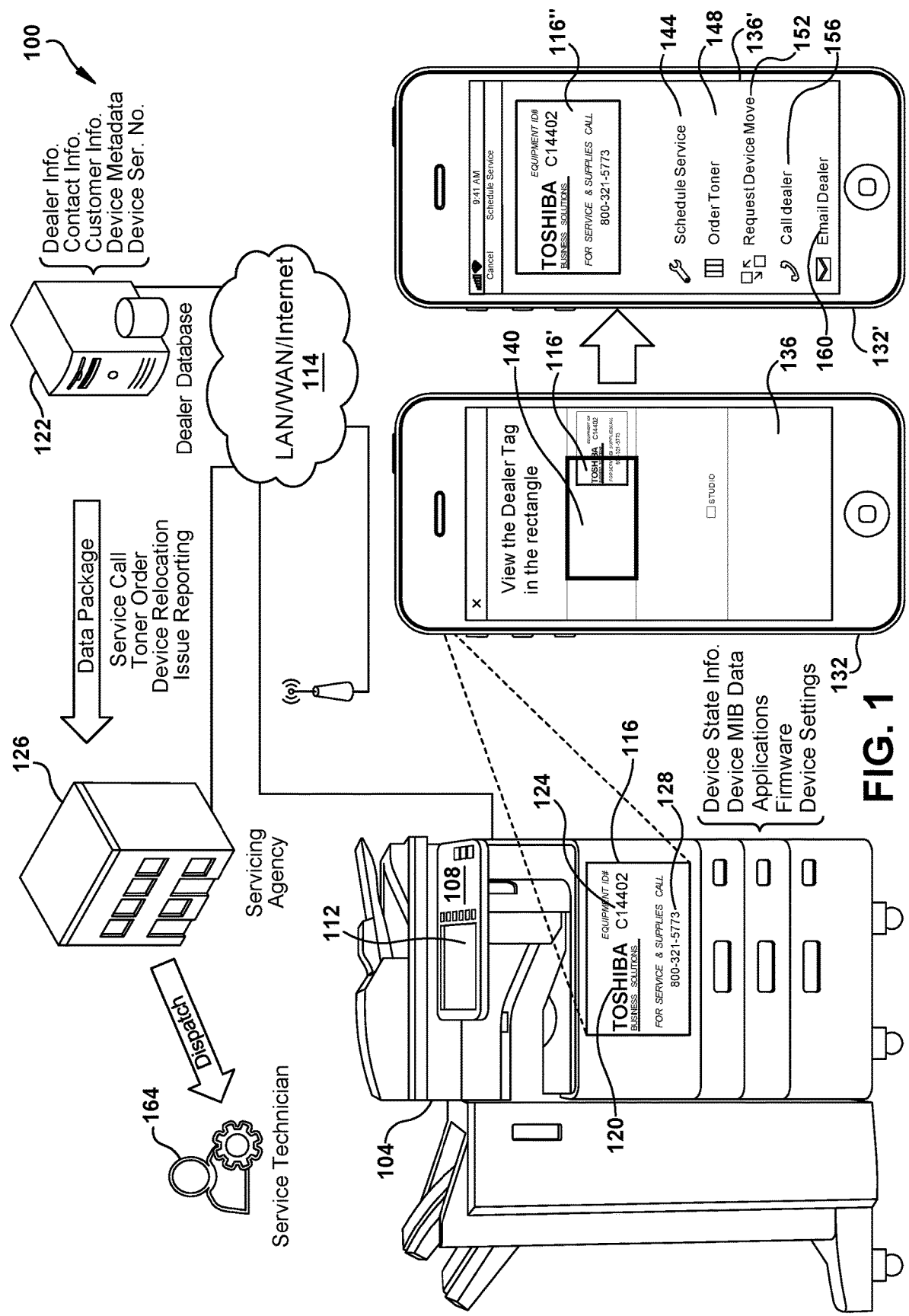
FIG. 1 is an example embodiment of a system for automated service call initiation.

In accordance with the subject application, FIG. 1 illustrates an example embodiment of a system 100 for automated service call initiation that includes one or more MFPs, illustrated by way of example by MFP 104. MFP 104 includes a user interface 108 suitably comprised of touchscreen 112. MFP 104 is in network communication with network cloud 114, suitably comprised of any wireless or wired local area network (LAN) or a wide area network (WAN) which can comprise the Internet, or any suitable combination thereof. Also in network communication are one or more digital devices including, for example dealer database server 122 and device servicing agency 126. MFP 104 includes a surface mounted asset tag 116 including character information including service agency name 120 equipment ID 124 and contact information 128, illustrated as a phone number, but may also comprise an email address, fax number, physical address or any other suitable contact information. A portable data device such as a tablet or smartphone, illustrated as smartphone 132 in the illustrated example, includes a user interface 136, suitably comprised of a touchscreen display, and a digital camera. An application running on smartphone 132 generates a camera viewfinder window 140 on user interface 136 which the user directs at asset tag 116'. A captured image of the asset tag 116' generates a corresponding image 116" on display 136' and is subject to optical character recognition (OCR). The OCR operation results in identifying the servicing dealer's name, contact information and equipment ID. This information is used to poll dealer database server 122 and secure device information such as dealer information, contact information, customer information, device metadata or device serial number. A display 136' is generated on smartphone 132' providing user selectable options including scheduling service 144, ordering toner 148, requesting a device move 152, calling an identified dealer 156 or emailing the identified dealer 160. If a service call is to be generated, smartphone 132 secures MFP state information, suitably from servicing agency if the MFP is monitored remotely, or directly from MFP 114 if not. State information may include any general device state data, management information base ("MIB") data, device applications, device firmware or device settings. This information is suitably aggregated with information from dealer database 120 and packaged to transmission to servicing agency 124 to place a service call, order consumables, scheduling a device move or report device issues. The information package may, in the instance of service calls, comprise a job ticket to dispatch a service technician 164.

Figure 2:
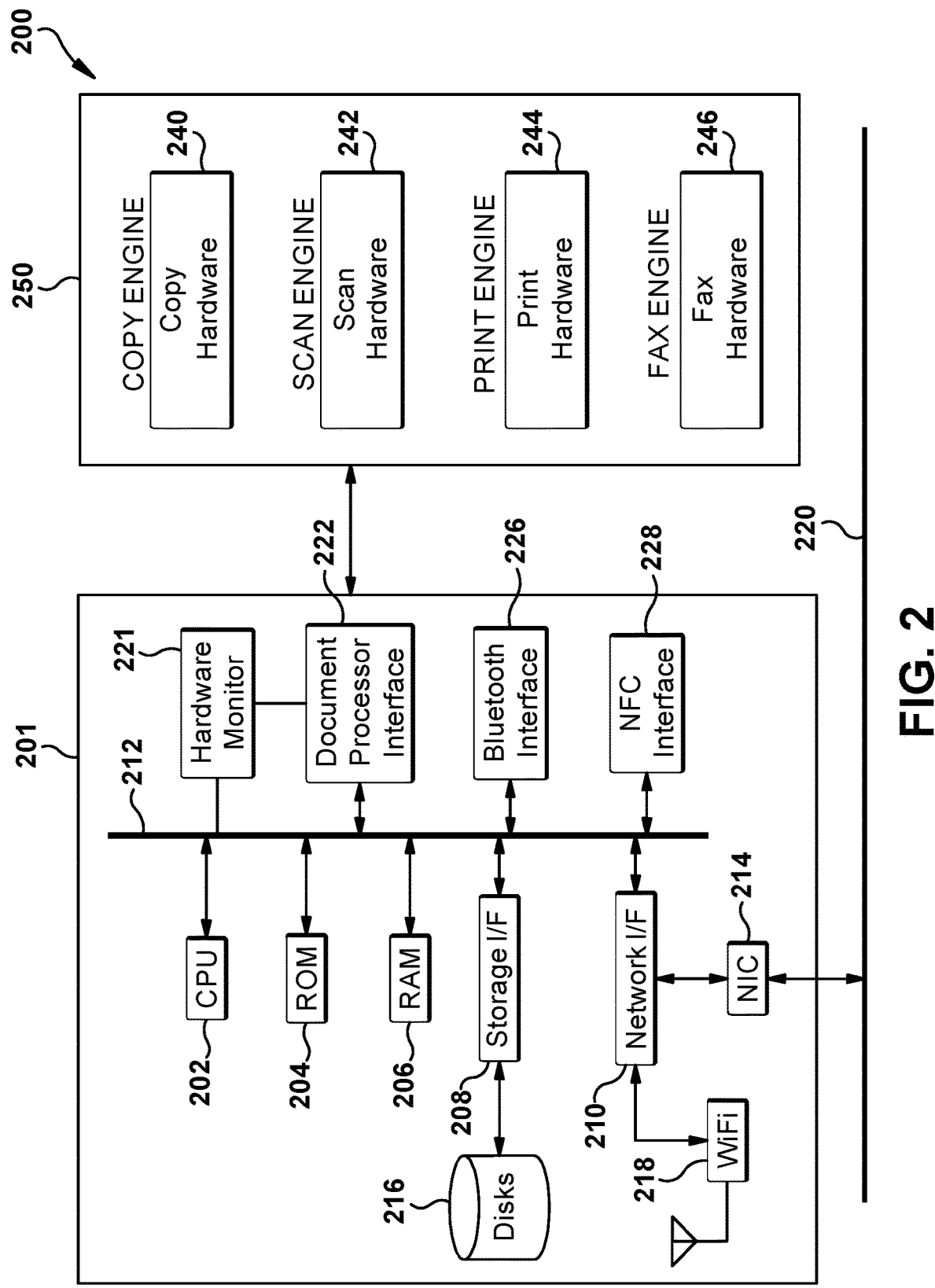
FIG. 2 is an example embodiment of a networked digital device.

Turning now to FIG. 2 illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226 and NFC interface 228 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
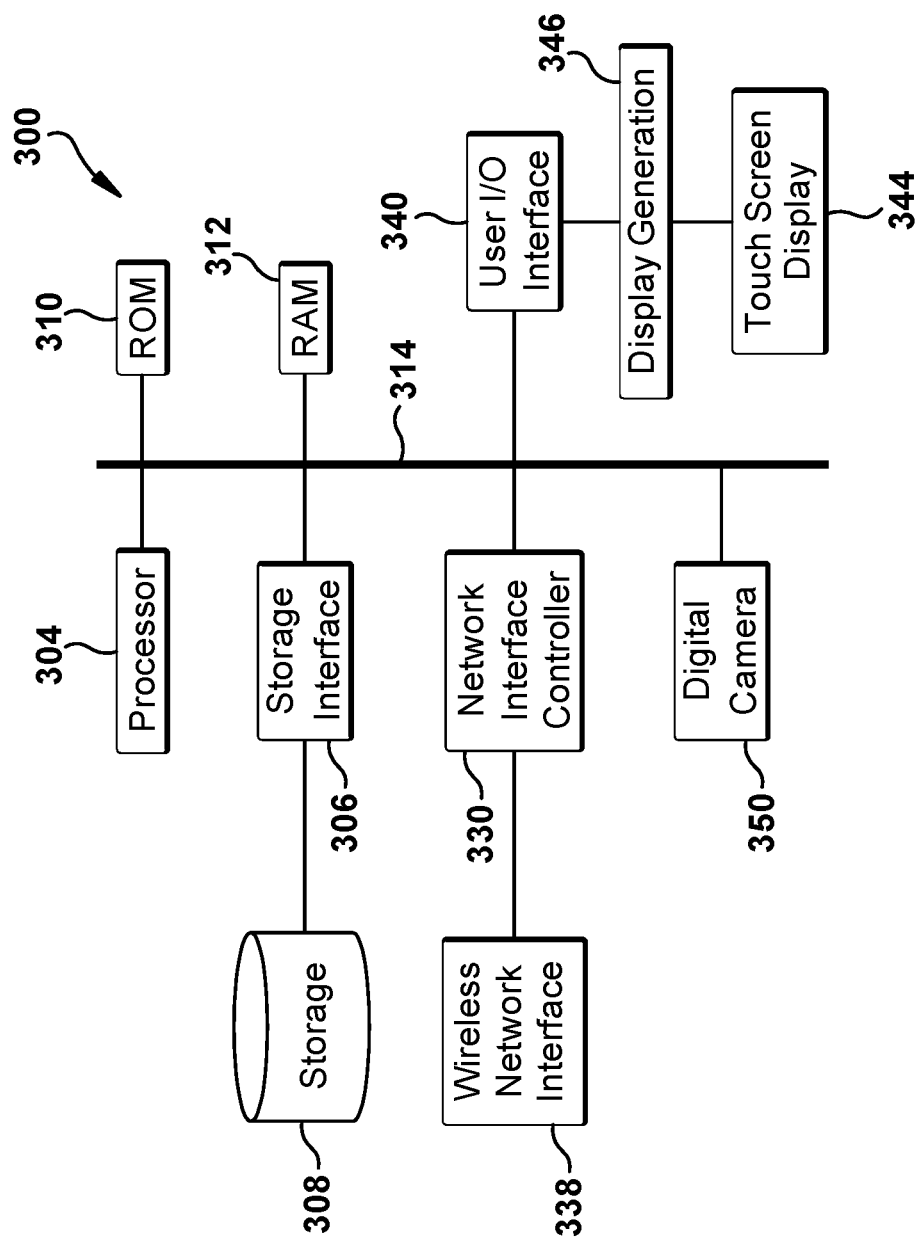
FIG. 3 is an example embodiment of a digital device such as a smartphone or tablet computer.

Turning now to FIG. 3, illustrated is an example of a digital device system 300 suitably comprising smartphone 132 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to an MFP or server is via a data network, such as a local area network (LAN), a wide area network (WAN), which may comprise the Internet, or any suitable combination thereof. A digital data connection is also suitably directly with an MFP or server, such as via BLUETOOTH, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. Processor 304 is also in data communication with digital camera 350, suitably comprised of an integrated camera in a smartphone or tablet computer. It will be understood that functional units are suitably comprised of intelligent units, including any suitable hardware or software platform.

Figure 4:
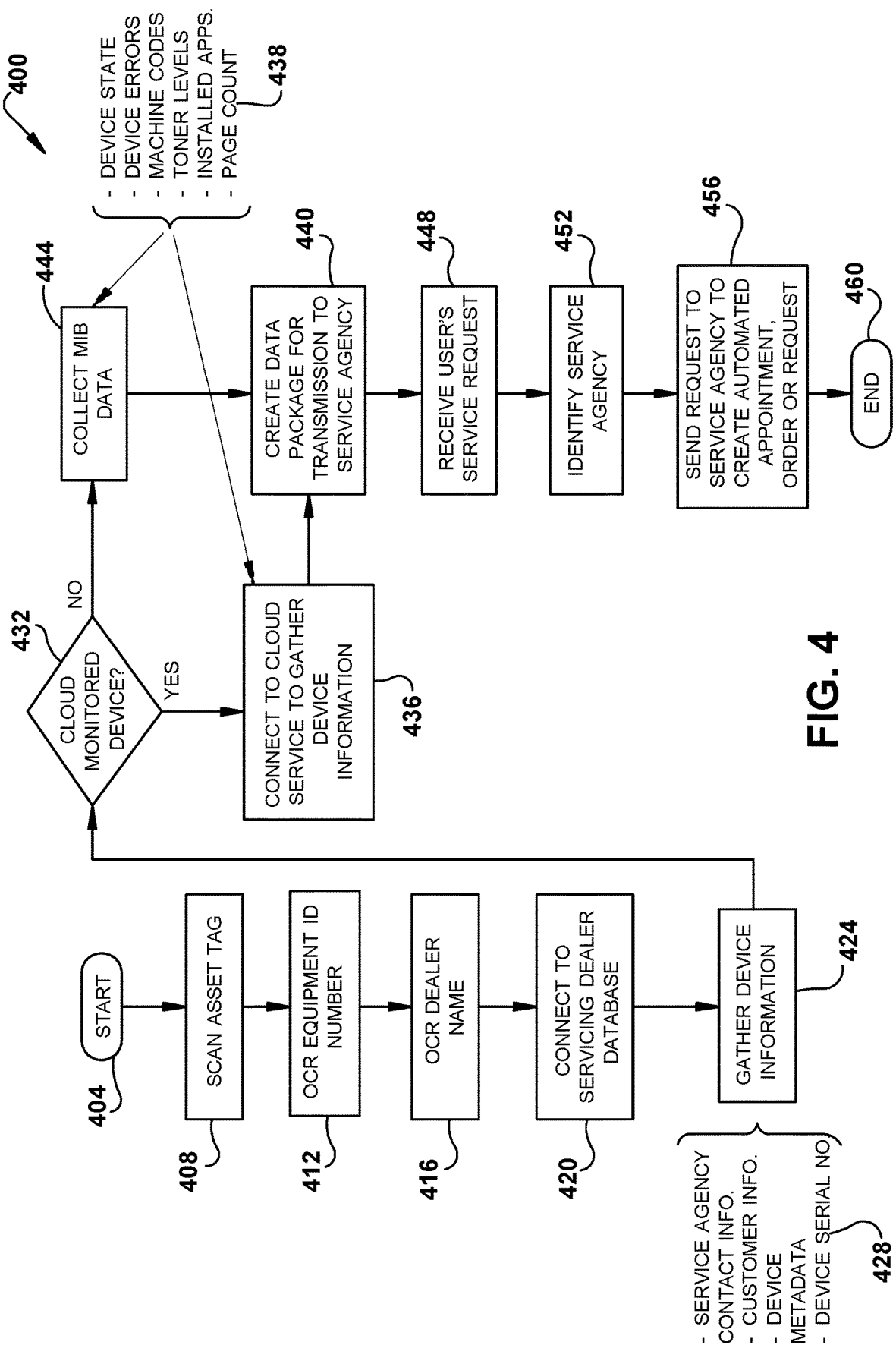
FIG. 4 is a flowchart of an example embodiment of a system for automated service call initiation.

FIG. 4 is a flowchart of an example embodiment of system 400 for automated service call initiation. The process commences at block 404 and proceeds to block 408 where an asset tag is scanned, suitably with a digital camera integrated into a smartphone or tablet computer. The process proceeds to blocks 412 and 416 wherein optical character recognition is performed on a captured digital image to extract a device equipment identifier, such as an equipment number and a dealer name or other identifier. Next, at block 420, a connection is established between a handheld device and a dealer database. A lookup is made for information 428 associated with an identified dealer at block 424. Retrieved information may include identification of a service agency associated with the device, as well as associated contact information. Retrieved information may also include information such as customer information, device metadata a device serial number, MAC address or other identifier, or a device location.

Next, a determination is made at block 432 in accordance with retrieved device information as to whether the particular device is monitored via a cloud services, such as e-Bridge Cloud Connect, available from Toshiba TEC. Cloud service monitoring may be accomplished by any cloud based service, and may suitably be done by service agency 126 of FIG. 1. If so, a connection is made to the cloud service to gather device information 438 at block 436. Such device information 438 may include data relative to device state, device errors, machine codes, consumable levels, such as toner or ink, installed applications, counter information, such as page count or reboot count, firmware version, software versions, hardware configuration, environmental conditions, or the like. If a determination is made at block 432 that the device is not associated with any cloud service, analogous device information 438 may be obtained directly from the device, such as by polling of MIB data in devices accessible under Simple Network Management Protocol (SNMP) at block 444.

Once device information 438 is obtained, the process proceeds to block 440 where a data package containing some or all of the dealer information and device information is assembled. The package includes information suitable to generate a parts order or a job ticket. When a request is received from a user on their handheld device at block 448, the service agency is identified at block 452 and a corresponding request is sent to that agency at block 456. The process suitably ends at block 460.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   memory;
   a data interface;
   a digital camera;
   a user interface including a display; and
   a processor,
   the processor configured to receive an electronic image of a multifunction peripheral asset tag via the digital camera, the asset tag including visible characters defining a service agency associated with the multifunction peripheral and an equipment identifier for the multifunction peripheral,
   the processor further configured to apply optical character recognition to a received electronic image,
   the processor further configured to obtain an equipment identifier and service agency name from recognized optical characters,
   the processor further configured to connect to a dealer database via the data interface,
   the processor further configured generate a query to the dealer database, the query including a request for device service information associated with an obtained service agency name and obtained equipment identifier,
   the processor further configured to receive service information responsive to the query via the data interface, the service information including contact information for a service agency identified by the service agency name,
   the processor further configured to determine, from received service information, whether the multifunction peripheral is a cloud monitored device,
   the processor further configured to receive device information for the multifunction peripheral from a cloud service when the multifunction peripheral is a cloud monitored device,
   the processor further configured to receive device information from the multifunction peripheral when the multifunction peripheral is not a cloud monitored device,
   the processor further configured to receive a user service request or order for the multifunction peripheral via the user interface,
   the processor further configured to generate a data package in accordance with a received user request or order, the service information and the device information, and
   the processor further configured to send a generated data package to the service agency via the data interface in accordance with the contact information.

2. The system of claim 1 wherein the service information includes one or more of device customer contact information, device metadata, device service records and device location.

3. The system of claim 2 wherein the device information includes one or more of device state, device errors, machine codes, toner level, ink level, installed applications and device page count.

4. The system of claim 3 wherein the digital camera is comprised of a smartphone camera or a tablet computer camera and the user interface is comprised of a touchscreen.

5. The system of claim 4 wherein the processor is further configured to automatically connect to the dealer database upon obtaining the equipment identifier and service agency name.

6. The system of claim 5 wherein the processor is further configured to display contact selection indicia via the user interface to selectively contact the service agency.

7. The system of claim 6 wherein the contact selection indicia includes indicia for one or more of scheduling a device service call, emailing the service agency, calling the service agency, placing a toner order or requesting a device move.

8. The system of claim 7 wherein the processor is further configured to generate the data package in accordance with a user selection of indicia on the display.

9. A method comprising:
   receiving an electronic image of a multifunction peripheral asset tag via a digital camera, the asset tag including visible characters defining a service agency associated with the multifunction peripheral and an equipment identifier for the multifunction peripheral;
   applying optical character recognition to a received electronic image;
   obtaining an equipment identifier and service agency name from recognized optical characters;
   connecting to a dealer database via a data interface;
   generating a query to the dealer database, the query including a request for device service information associated with an obtained service agency name and obtained equipment identifier;
   receiving service information responsive to the query, the service information including contact information for a service agency identified by the service agency name;
   determining, from received service information, whether the multifunction peripheral is a cloud monitored device;

receiving device information for the multifunction peripheral from a cloud service when the multifunction peripheral is a cloud monitored device;

receiving device information from the multifunction peripheral when the multifunction peripheral is not a cloud monitored device;

receiving a user service request or order for the multifunction peripheral via a user interface;

generating a data package in accordance with a received user request or order, the service information and the device information; and sending a generated data package to the service agency via the data interface in accordance with the contact information.

10. The method of claim 9 wherein receiving the service information includes receiving one or more of device customer contact information, device metadata, device service records and device location.

11. The method of claim 10 wherein receiving the device information includes receiving one or more of device state, device errors, machine codes, toner level, ink level, installed applications and device page count.

12. The method of claim 11 further comprising:

receiving the electronic image from a the digital camera integrated into a smartphone camera or a tablet computer camera; and receiving the user service request or order into the user interface comprised of a touchscreen.

13. The method of claim 12 further comprising:

automatically connecting to the dealer database upon obtaining the equipment identifier and service agency name.

14. The method of claim 13 further comprising:

displaying contact selection indicia to selectively contact the service agency in accordance with a user request.

15. The method of claim 14 wherein the contact selection indicia includes indicia for one or more of scheduling a device service call, emailing the service agency, calling the service agency, placing a toner order or requesting a device move.

16. The method of claim 15 further comprising:

generating the data package in accordance with a user selection of indicia on the display.

17. A system comprising:

memory storing service agency information corresponding to each of a plurality of device service agencies;

a network interface; and a processor;

the processor configured to receive a query from a portable data device via the network interface, the query including data identifying a multifunction peripheral and a service agency name associated with the multifunction peripheral, the processor further configured to identify a service agency from the service agency name;

the processor further configured to retrieve service agency information associated with the service agency and the identified multifunction peripheral, the processor further configured to send retrieved service agency information to the portable data device via the network interface, the processor further configured to receive a service or order request associated with the identified service agency and identified multifunction peripheral, the service or order request including device state data corresponding to a state of the identified multifunction peripheral, the processor further configured to generate a service or order request package in accordance with a received service or order request, service agency information and device state data, and the processor further configured to send a generated service or order request package to the identified service agency via the network interface.

18. The system of claim 17 wherein the service agency information includes one or more of contact information for the service agency, device customer contact information, device metadata, device service records and device location.

19. The system of claim 18 wherein the service request or order includes device state data including one or more of device errors, machine codes, toner level, ink level, installed applications, firmware version and device page count.

20. The system of claim 18 wherein the processor is further configured to selectively contact the service agency in accordance with received contact information in accordance with a user request.

* * * * *